United States Patent
Haas et al.

(10) Patent No.: US 10,696,331 B2
(45) Date of Patent: Jun. 30, 2020

(54) VEHICLE BODY

(71) Applicant: Bayerische Motoren Werke Aktiengesellschaft, Munich (DE)

(72) Inventors: Thorsten Haas, Unterschleissheim (DE); Gerhard Fichtinger, Grasbrunn (DE)

(73) Assignee: Bayerische Motoren Werke Akteingesellschaft, Munich (DE)

( * ) Notice: Subject to any disclaimer, the term of this patent is extended or adjusted under 35 U.S.C. 154(b) by 121 days.

(21) Appl. No.: 16/114,720

(22) Filed: Aug. 28, 2018

(65) Prior Publication Data

US 2018/0362095 A1 Dec. 20, 2018

Related U.S. Application Data

(63) Continuation of application No. PCT/EP2017/054036, filed on Feb. 22, 2017.

(30) Foreign Application Priority Data

Feb. 29, 2016 (DE) .................. 10 2016 203 163

(51) Int. Cl.
*B62D 25/08* (2006.01)
*B62D 25/16* (2006.01)

(52) U.S. Cl.
CPC ......... *B62D 25/085* (2013.01); *B62D 25/082* (2013.01); *B62D 25/088* (2013.01); *B62D 25/163* (2013.01)

(58) Field of Classification Search
CPC .... B62D 25/163; B62D 25/10; B62D 25/105; B62D 25/16; B62D 25/085; B62D 25/082; B62D 25/088

(Continued)

(56) References Cited

U.S. PATENT DOCUMENTS 5,417,471 A * 5/1995 Kreis .................. B60R 16/0239
  296/198
6,793,275 B1 * 9/2004 Chernoff ................ B62D 24/02
  180/69.2

(Continued)

FOREIGN PATENT DOCUMENTS

BE 569 772 A 1/1959
EP 1 153 823 A2 11/2001
EP 2 570 334 A2 3/2013

OTHER PUBLICATIONS

International Search Report (PCT/ISA/210) issued in PCT Application No. PCT/EP2017/054036 dated May 19, 2017 with English translation (four (4) pages).
German-language Written Opinion (PCT/ISA/237) issued in PCT Application No. PCT/EP2017/054036 dated May 19, 2017 (seven (7) pages).

(Continued)

*Primary Examiner* — Dennis H Pedder
(74) *Attorney, Agent, or Firm* — Crowell & Moring LLP

(57) ABSTRACT

A vehicle body has an inner body structure and an outer body skin, wherein the body structure has, in the region of a vehicle front end, a left supporting carrier and a right supporting carrier and a left suspension strut cup and a right suspension strut cup for accommodating respective suspension struts belonging to the chassis of the vehicle. Each suspension strut cup lies on the side of the associated supporting carrier facing the longitudinal center plane of the vehicle. The body skin has, in the region of the vehicle front end, a left front body side part, a right front body side part, and a front hood arranged between said front body side parts. The left front body side part covers the left suspension strut cup. The right front body side part covers the right suspension strut cup. A left front body skin supporting element is attached to the left supporting carrier, which left front body skin supporting element supports the left front body side part above the top side of the left suspension strut cup and determines a vertical distance between the suspen- (Continued)

sion strut cup and the left front body side part, by which distance the top side of the left suspension strut cup remains accessible. And, a right front body skin supporting element is attached to the right supporting carrier, which right front body skin supporting element supports the right front body side part above the top side of the right suspension strut cup and determines a vertical distance between the suspension strut cup and the left front body side part, by which distance the top side of the right suspension strut cup remains accessible.

10 Claims, 2 Drawing Sheets

(58) Field of Classification Search
USPC .... 296/198, 193.11, 203.01–203.03, 187.09, 296/193.09
See application file for complete search history.

(56) References Cited

U.S. PATENT DOCUMENTS

| | | | | |
|---|---|---|---|---|
| 8,783,760 | B2* | 7/2014 | Van Kaam | B62D 25/088 |
| | | | | 296/192 |
| 2002/0008408 | A1 | 1/2002 | Tilsner et al. | |
| 2008/0100073 | A1* | 5/2008 | Mitsuyama | B62D 25/163 |
| | | | | 293/132 |
| 2014/0117718 | A1* | 5/2014 | Van Kaam | B62D 25/088 |
| | | | | 296/193.01 |
| 2015/0115655 | A1* | 4/2015 | Kawakami | B62D 25/088 |
| | | | | 296/187.12 |
| 2016/0031484 | A1 | 2/2016 | Nakauchi et al. | |

OTHER PUBLICATIONS

German-language Search Report issued in counterpart German Application No. 102016203163.5 dated Nov. 23, 2016 with partial English translation (13 pages).
Daniels J., "Die Porsche-Technik-Ingenieurskunst aus Zuffenhausen" Delius Klasing Verlag, 2007, (five (5) pages).

* cited by examiner

VEHICLE BODY

CROSS REFERENCE TO RELATED APPLICATIONS

This application is a continuation of PCT International Application No. PCT/EP2017/054036, filed Feb. 22, 2017, which claims priority under 35 U.S.C. § 119 from German Patent Application No. 10 2016 203 163.5, filed Feb. 29, 2016, the entire disclosures of which are herein expressly incorporated by reference.

BACKGROUND AND SUMMARY OF THE INVENTION

The invention relates to a vehicle body having an inner body structure and an outer body skin.

In many vehicles, the front axle has suspension struts, the top fastening points of which are located in a suspension strut cup of the body structure. These fastening points have to be accessible both during vehicle manufacture and also later for servicing or repair purposes. Therefore, the suspension strut cups of the vehicle front end are usually arranged such that they are accessible by opening a front hatch. This requires the front hatch to be so wide that it extends between the two outer lateral boundaries of the two suspension strut cups. To this end, a front hatch can be configured, for example, such that it engages around the top side of the vehicle front end, so that the respective front hatch joint is located close to the, or on, the vehicle outer side. However, if the lateral front hatch joint, for example for design reasons, is situated on the inside of the top side of the vehicle front end, this may result, depending on the size and construction of the vehicle, in the top side of the respective suspension strut cup being situated outside the space which is closed off by the front hatch, that is to say below the inwardly wrapped-around front body side part. Therefore, conflicts in objectives between design and technical requirements may occur, and these have to be resolved.

The object of the present invention is therefore to provide a vehicle body of this generic type which allows the vehicle front end to be provided with a narrow front hatch, the lateral joints of said front hatch being situated on the inside with respect to the body side part, for example on that side of the respective front headlamp which faces the vehicle longitudinal center plane, and in the case of which front flap it is nevertheless possible to be able to reach the top side of the respective suspension strut cup using tools.

This and other objects are achieved by a vehicle body having an inner body structure and an outer body skin, the body structure, in the region of a vehicle front end, has a left-hand-side supporting carrier and a right-hand-side supporting carrier and also a left-hand-side suspension strut cup and a right-hand-side suspension strut cup for receiving in each case one suspension strut which forms part of the chassis of the vehicle. The respective suspension strut cup rests on that side of the associated supporting carrier which is situated in relation to the longitudinal center plane of the vehicle, and the body skin, in the region of the vehicle front end, has a left-hand-side front body side part, a right-hand-side front body side part and a front hatch which is arranged between said front body side parts. This vehicle body according to the invention is distinguished in that the left-hand-side front body side part covers the left-hand-side suspension strut cup, in that the right-hand-side front body side part covers the right-hand-side suspension strut cup, in that a left-hand-side front body skin supporting element is fitted to the left-hand-side supporting carrier and supports the left-hand-side front body side part above the top side of the left-hand-side suspension strut cup and determines a vertical distance between the suspension strut cup and the left-hand-side front body side part through which the top side of the left-hand-side suspension strut cup remains accessible, and in that a right-hand-side front body skin supporting element is fitted to the right-hand-side supporting carrier and supports the right-hand-side front body side part above the top side of the right-hand-side suspension strut cup and determines a vertical distance between the suspension strut cup and the right-hand-side front body side part through which the top side of the right-hand-side suspension strut cup remains accessible.

The provision according to the invention of body skin supporting elements on the respective lateral supporting carrier of the body structure allows the top section of the front body side part, which top section is inwardly wrapped around in relation to the vehicle longitudinal center plane, to be held at a vertical distance from the top side of the associated suspension strut cup and to be supported at the bottom and at the same time allows the thin body skin of the wrapped-around region of the body side part to be supported and to be reinforced. The provision of a vertical distance between the lateral supporting carrier and the top section of the front body side part additionally creates a deformation space which is provided for pedestrian protection, that is to say in the event of a head impact on the front hatch or on the front body side part for example. To this end, the body skin supporting element is designed such that it can yield for pedestrian protection. The reinforcement of the top section of the front body side part by the body skin supporting element therefore prevents the wrapped-around region of the body side part from being dented in the event of a possible slight pressure loading from above, but permits sufficient deformation both of the body skin supporting element and also of the wrapped-around front body side part in the event of a head impact of a pedestrian. In order to achieve the same advantage, the body skin supporting element also ensures that there is a vertical distance between the top section of the front body side part and the top side of the suspension strut cup, as a result of which an access space is also created, it being possible to work on the screw connections, which are provided on the top side of the respective suspension strut cup, through said access space for the purpose of fastening the suspension strut to the body structure using tools.

A particular advantage of this solution according to the invention is also that a vehicle, which was initially designed and equipped with a front hatch which extends virtually over the entire width of the vehicle front end and has lateral front hatch joints, can be reconstructed in the case of a so-called "facelift" to form a vehicle with internal front hatch joints and a narrow front hatch, without the inner body structure having the front supporting carriers and the suspension strut cups having to be changed.

The respective body skin supporting element is preferably provided with at least one passage opening through which access to the top side of the associated suspension strut cup is formed. Access to the screw connections, which are provided on the top side of the suspension strut cup, for the suspension strut is created through a passage opening of this kind.

It is also advantageous when the respective body skin supporting element is provided with or connected to a carrier structure which is situated on that side of the associated supporting carrier which faces the vehicle longitudinal center plane, which carrier structure is designed for receiving and/or fitting a hinge of the front hatch and/or of a front hatch supporting element, but also other components such as, for example, a wiping water container, an intake noise damper and/or a Bowden cable. A carrier structure of this kind allows the front hatch to be connected in an articulated manner to the body structure in a particularly elegant manner. Owing to the internal join between the front hatch and the front body side wall, the front hatch hinges cannot be fitted to the supporting carrier or to the A pillar. For reasons of installation space, the hinges also cannot be fitted to the end wall in the case of an internal join since the installation space there is already occupied by, for example, a windscreen wiper system and/or a braking force amplifier.

In this case, it is particularly advantageous when the carrier structure is situated on that side of the associated suspension strut cup which faces the vehicle longitudinal center plane, and when the at least one passage opening is provided in the carrier structure. The position of the carrier structure allows the provision of a particularly narrow front hatch and therefore of front hatch side joins which are situated toward the inside to a great extent. In this case, the provision of the passage opening ensures accessibility to the area above the top side of the suspension strut cup and therefore access for tools for screwing work on the suspension strut.

The invention also relates to a method for mounting a front body side part of a vehicle body which is designed according to the invention. Said method is distinguished by the steps of:
a) providing a body shell having a vehicle front end which has a left-hand-side and a right-hand-side suspension strut cup and, on that side of the respective suspension strut cup which faces the vehicle outer side, has a left-hand-side and a right-hand-side front supporting carrier which are each provided with a front body skin supporting element which is situated above the suspension strut cup;
b) mounting the front suspension struts in the respectively associated suspension strut cup of the body structure; and
c) mounting the respective front body side part on the body structure, wherein a region of the body skin of the respective front body side part is supported on the associated body skin supporting element.

This mounting method is particularly suitable for vehicle manufacture.

As an alternative, the method can also be designed in line with the following steps:
a') providing a body shell having a vehicle front end which has a left-hand-side and a right-hand-side suspension strut cup and, on that side of the respective suspension strut cup which faces the vehicle outer side, has a left-hand-side and a right-hand-side front supporting carrier which are each provided with a front body skin supporting element which is situated above the suspension strut cup;
b') mounting the respective front body side part on the body structure, wherein a region of the body skin of the respective front body side part is supported on the associated body skin supporting element; and
c') mounting the front suspension struts in the respectively associated suspension strut cup of the body structure.

It is advantageous in the case of both methods when the respective front body side part is fixedly connected, preferably joined (for example welded, adhesively bonded, hooked or screwed), to the associated body skin supporting element.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
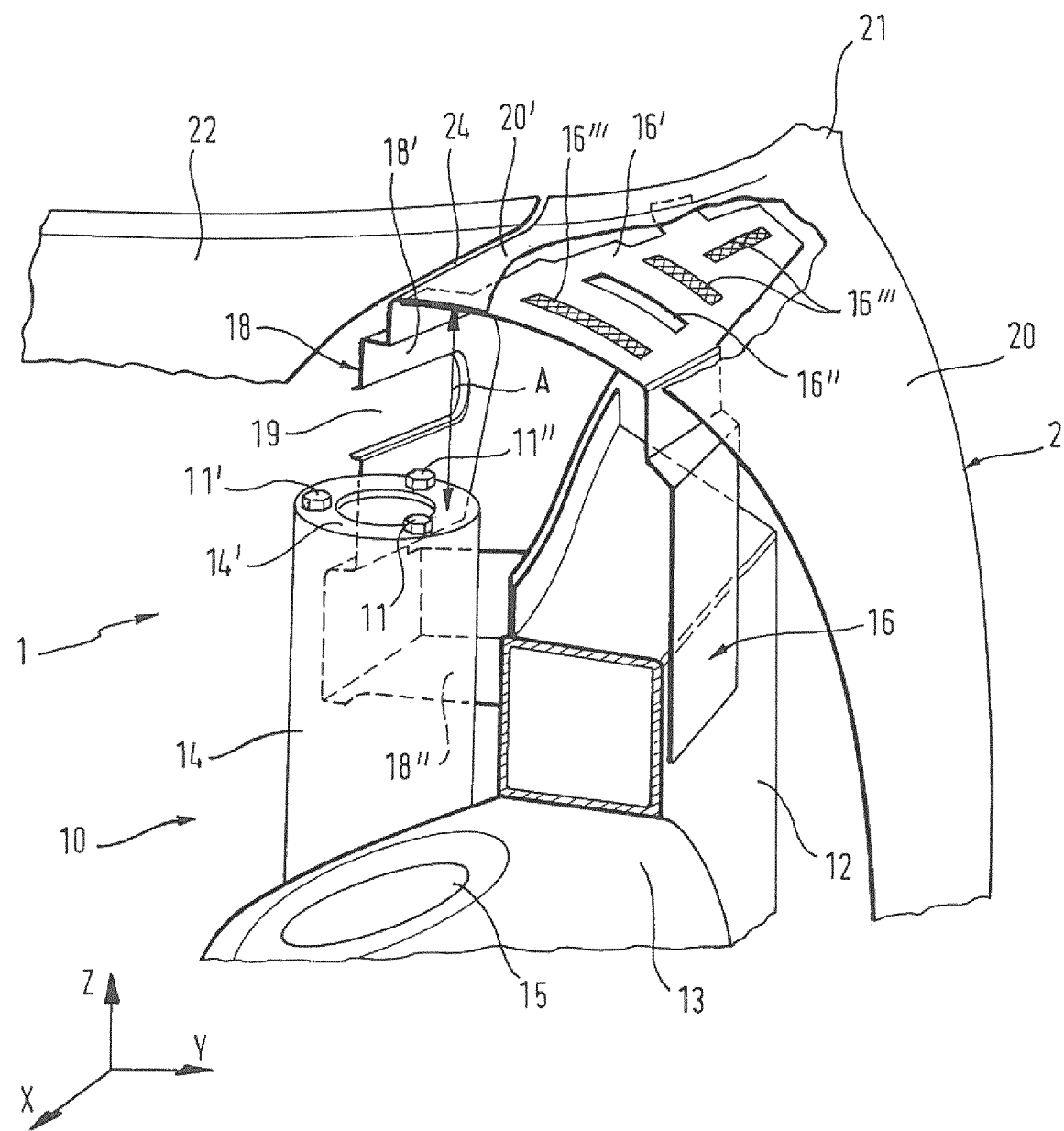
FIG. 1 is a partially sectioned front view of the left-hand-side (as seen in the direction of travel) of a vehicle front end which is designed according to an embodiment of the invention.

FIG. 1 shows a partially cut-open perspective illustration of a vehicle front end 10 of an inner body structure 1 of a vehicle body. An outer body skin 2, which determines the outer design of the vehicle, is fitted on the outside of the inner body structure 1. FIG. 1 shows only a section of the vehicle front end 10, specifically the left-hand-side front vehicle side, as seen in the direction of travel. The right-hand-side front vehicle side, as seen in the direction of travel, is of mirror-inverted construction to said left-hand-side front vehicle side. The invention will therefore be described below only with reference to the left-hand-side front vehicle side illustrated in FIG. 1, wherein it goes without saying that the invention is also realized on the right-hand-side front vehicle side with a minor-inverted construction.

Essential elements of the vehicle front end 10 are supporting carriers 12 of the body structure 1 which are provided in the region of the vehicle sides, wherein only the left-hand-side supporting carrier 12 is illustrated in FIG. 1. The chassis components (not shown) of the front axle are fitted to said supporting carriers 12, so that the vehicle weight is supported on the front wheel suspension systems and therefore on the road by means of the supporting carriers. Furthermore, the front supporting carriers serve to absorb collision forces in the event of an accident.

A left-hand-side suspension strut cup 14 which issues into an associated left-hand-side wheel housing 13 by way of a lower opening 15 is fastened on that side of the left-hand-side supporting carrier 12, shown in FIG. 1, which is situated in relation to the vertical vehicle longitudinal center plane XZ. The suspension strut (not shown in FIG. 1) is inserted into the suspension strut cup 14 from below through the wheel housing 13 and the opening 15 and is fastened to the suspension strut cup 14 and therefore to the inner body structure 1 at the top side 14' of the suspension strut cup by screw fastenings 11, 11', 11", only schematically illustrated in FIG. 1.

In the section of the vehicle front end shown in FIG. 1, the body outer skin 2 is formed by body side parts, with only the left-hand-side front body side part 20 being illustrated in FIG. 1. Said left-hand-side front body side part 20 is fitted to a cowl (not shown) below the windshield of the vehicle and, for example, merges, as indicated in FIG. 1, with the left-hand-side front A pillar 21 of the vehicle body. The front body side part 20 is also connected to the inner body structure 1 in the lower region of the vehicle body, not shown in the figure.

As shown in FIG. 1, the left-hand-side front body side part 20 is wrapped around on its top side in the direction of the vehicle longitudinal center plane XZ. A body skin supporting element 16, which is fitted, that is to say joined, to the supporting carrier 12 by means of a joining method, for example by screwing, welding, hooking or by adhesive bonding, is provided for the purpose of supporting said region 20', which is substantially wrapped around in the horizontal, of the body side part 20. Said body skin supporting element 16, which is fastened to the outer side of the supporting carrier 12, extends upward from the supporting carrier 12 and there bears, by way of a supporting section 16', from below against the region 20' of the front body side part 20. A vertical distance A is formed between the supporting section 16' of the body skin supporting element 16 and the top side 14' of the suspension strut cup 14. This vertical distance allows the screw connections 11, 11', 11" of the suspension strut to be accessed by means of a tool at the top side 14' of the suspension strut cup 14.

At its inner end which faces the vehicle longitudinal center plane XZ, the supporting section 16' of the body skin supporting element 16 is provided with a carrier structure 18 which extends downward and has a first carrier element 18' that is vertical or oriented obliquely with a vertical component, and a second carrier element 18", which runs at its lower end to the supporting carrier 12 and is horizontal or oriented obliquely with a horizontal component and is connected to the supporting carrier 12. The first carrier element 18' is provided with a passage opening 19 through which access to the space between the top side 14' of the suspension strut cup 14 and the supporting section 16' of the body skin supporting element 16 is created. It is therefore possible to reach the screw connections 11, 11', 11" of the suspension strut on the suspension strut cup 14 through said opening 19' using tools.

The first carrier element 18' of the carrier structure 18 also serves for fitting a hinge for the front hatch 22, only schematically illustrated in FIG. 1, with the hinge not being illustrated in FIG. 1 for reasons of clarity. Other components, such as a wiping water container, an intake noise damper and/or a Bowden cable for example, can also be fitted to said first carrier element 18'. The front hatch 22 is therefore pivotably mounted to the carrier structure 18 by way of the hinge (not shown). A front hatch supporting element for the opened front hatch, for example a pneumatic spring, can also be fitted to the first carrying element 18' of the carrier structure 18. FIG. 1 also shows the front hatch joint 24 which extends between the boundary edge, which faces the vehicle longitudinal center plane XZ, of the top region 20' of the body side part 20 and the left-hand-side side edge (as seen in the direction of travel) of the front hatch 22.

Figure 2:
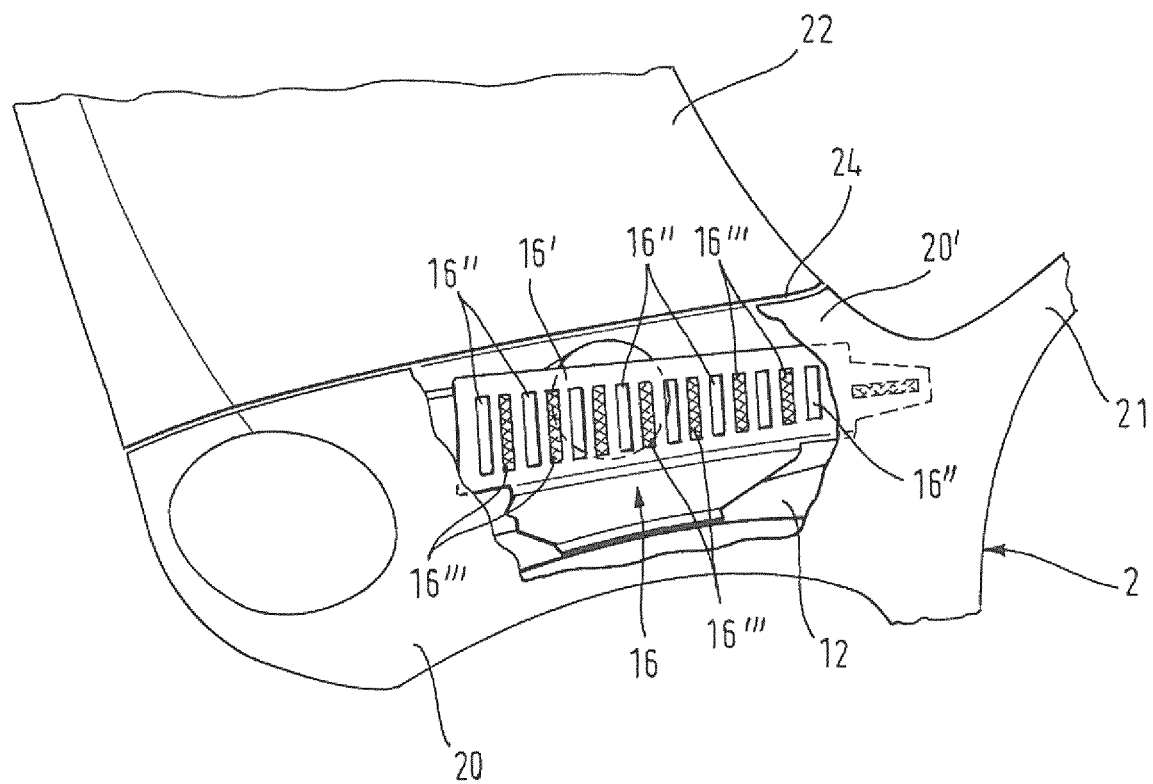
FIG. 2 is a plan view of the section of the vehicle front end from FIG. 2, likewise partially cut open.

The position and the design of the top supporting section 16' of the body skin supporting element 16 are shown in the section, which is broken open in FIG. 1, of the top substantially horizontal region 20' of the front body side part 20. Said top supporting section 16' is, as also shown in FIG. 2, provided with a plurality of apertures 16" which are provided firstly for weight reduction reasons but which secondly also form passage openings to the space above the top side 14' of the suspension strut cup 14, as shown in FIG. 2, in order to permit accessibility to the suspension strut screw connections. Said apertures can also serve for providing accessibility in the event of repair work since relatively small dents in the body outer skin can be pushed out through the apertures by means of a tool.

Fastening elements 16''', for example adhesion points, are provided between the apertures 16" on the top side of the section 16' of the body skin supporting element 16, the supporting section 16' of the body skin supporting element 16 being adhesively bonded to the top region 20' of the front body side part 20 at said adhesion points.

If, during manufacture of the vehicle, the front body side part 20 is already connected to the inner body structure 1 at the time at which the chassis is fitted ("married") to the vehicle body, the suspension strut is screw-connected through the passage opening 19 in the vertical carrier element 18' of the carrier structure 18 by way of the screw connections 11, 11', 11". If, however, the front body side part 20 is not yet connected to the inner body structure 1, the screw connections 11, 11', 11" are accessible for screwing tools through the passage openings which are formed by the apertures 16". In this case, the body side part 20 is fitted to the body structure 1 only after the "marrying".

Reference signs in the claims, in the description and in the drawings serve merely for improved understanding of the invention, and are not intended to restrict the scope of protection.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle body, comprising:
    an inner body structure, wherein
    the inner body structure, in a region of a vehicle front end, has a left-hand-side supporting carrier and a right-hand-side supporting carrier and also a left-hand-side suspension strut cup and a right-hand-side suspension strut cup for receiving, in each case, one suspension strut which forms part of a chassis of the vehicle, and
    a respective suspension strut cup rests on that side of the associated supporting carrier which is situated in relation to a longitudinal center plane of the vehicle; and
    an outer body skin, wherein
    the outer body skin, in a region of the vehicle front end, has a left-hand-side front body side part, a right-hand-side front body side part, and a front hatch which is arranged between said left and right-hand-side front body side parts,
    wherein
    the left-hand-side front body side part covers the left-hand-side suspension strut cup,
    the right-hand-side front body side part covers the right-hand-side suspension strut cup,
    a left-hand-side front body skin supporting element is fitted to the left-hand-side supporting carrier and supports the left-hand-side front body side part above a top side of the left-hand-side suspension strut cup and determines a vertical distance between the suspension strut cup and the left-hand-side front body side part through which the top side of the left-hand-side suspension strut cup remains accessible, and
    a right-hand-side front body skin supporting element is fitted to the right-hand-side supporting carrier and supports the right-hand-side front body side part above a top side of the right-hand-side suspension strut cup and determines a vertical distance between the suspension strut cup and the right-hand-side front body side part through which the top side of the right-hand-side suspension strut cup remains accessible.

2. The vehicle body as claimed in claim 1, wherein
    the respective body skin supporting element is provided with at least one passage opening through which access to the top side of the associated suspension strut cup is formed.

3. The vehicle body as claimed in claim 2, wherein
the respective body skin supporting element is provided with or connected to a carrier structure which is situated on that side of the associated supporting element which faces the vehicle longitudinal center plane, which carrier structure is configured for receiving and/or fitting a hinge of the front hatch, a front hatch supporting element, and/or other vehicle components.

4. The vehicle body as claimed in claim 3, wherein the other vehicle components comprise:
a wiping water container, an intake noise damper and/or a Bowden cable.

5. The vehicle body as claimed in claim 3, wherein
the carrier structure is situated on that side of the associated suspension strut cup which faces the vehicle longitudinal center plane, and
the at least one passage opening is provided in the carrier structure.

6. A method for mounting a front body side part of a vehicle body, the method comprising the steps of:
a) providing a body shell having a vehicle front end which has a left-hand-side and a right-hand-side suspension strut cup and, on that side of a respective suspension strut cup which faces a vehicle outer side, has a left-hand-side and a right-hand-side front supporting carrier which are each provided with a front body skin supporting element which is situated above the suspension strut cup;
b) mounting the suspension struts in the respectively associated suspension strut cup of the body structure; and
c) mounting respective front body side parts on the body structure, wherein a region of the body skin of the respective front body side part is supported on the associated body skin supporting element, wherein
the left-hand-side front body side part covers the left-hand-side suspension strut cup,
the right-hand-side front body side part covers the right-hand-side suspension strut cup,
a left-hand-side front body skin supporting element is fitted to the left-hand-side supporting carrier and supports the left-hand-side front body side part above a top side of the left-hand-side suspension strut cup and determines a vertical distance between the suspension strut cup and the left-hand-side front body side part through which the top side of the left-hand-side suspension strut cup remains accessible, and
a right-hand-side front body skin supporting element is fitted to the right-hand-side supporting carrier and supports the right-hand-side front body side part above a top side of the right-hand-side suspension strut cup and determines a vertical distance between the suspension strut cup and the left-hand-side front body side part through which the top side of the right-hand-side suspension strut cup remains accessible.

7. The method as claimed in claim 6, wherein
the respective front body side part is fixedly connected to the associated body skin supporting element in step c).

8. A method for mounting a front body side part of a vehicle body, the method comprising the steps of:
a') providing a body shell having a vehicle front end which has a left-hand-side and a right-hand-side suspension strut cup and, on that side of a respective suspension strut cup which faces the vehicle outer side, has a left-hand-side and a right-hand-side front supporting carrier which are each provided with a front body skin supporting element which is situated above the suspension strut cup;
b') mounting the respective front body side parts on the body shell, wherein a region of the body skin of the respective front body side part is supported on the associated body skin supporting element, wherein
the left-hand-side front body side part covers the left-hand-side suspension strut cup,
the right-hand-side front body side part covers the right-hand-side suspension strut cup,
a left-hand-side front body skin supporting element is fitted to the left-hand-side supporting carrier and supports the left-hand-side front body side part above a top side of the left-hand-side suspension strut cup and determines a vertical distance between the suspension strut cup and the left-hand-side front body side part through which the top side of the left-hand-side suspension strut cup remains accessible, and
a right-hand-side front body skin supporting element is fitted to the right-hand-side supporting carrier and supports the right-hand-side front body side part above a top side of the right-hand-side suspension strut cup and determines a vertical distance between the suspension strut cup and the left-hand-side front body side part through which the top side of the right-hand-side suspension strut cup remains accessible, and
c') subsequently mounting the front suspension struts in the respectively associated suspension strut cup of the body structure.

9. The method as claimed in claim 8, wherein
the respective front body side part is fixedly connected to the associated body skin supporting element in the fixed connection.

10. The method as claimed in claim 9, wherein the fixed connection is a weld, adhesive bond or a screw connection.

* * * * *